G. A. HARTMAN.
MOTOR CYCLE SEAT.
APPLICATION FILED MAR. 21, 1913.
1,082,423.
Patented Dec. 23, 1913.
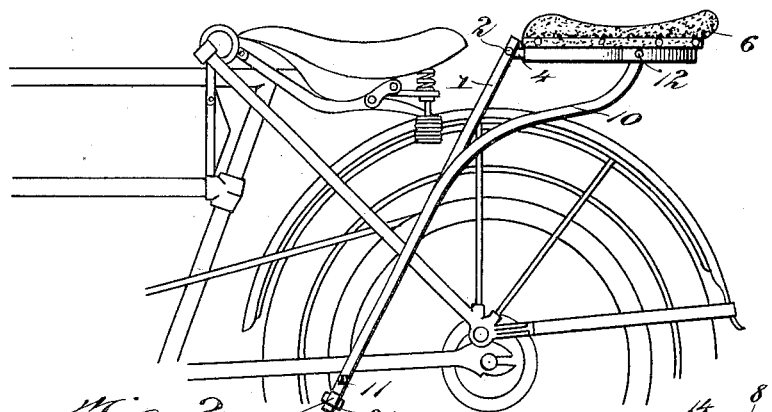
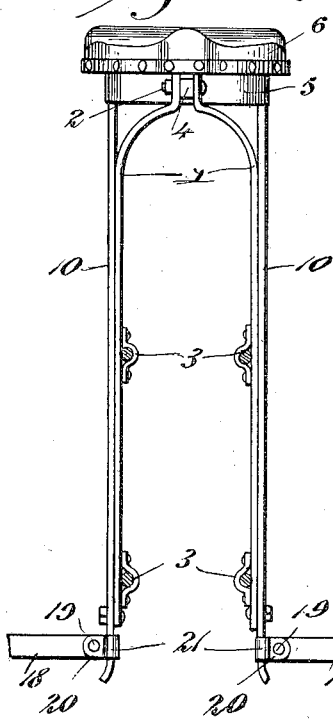
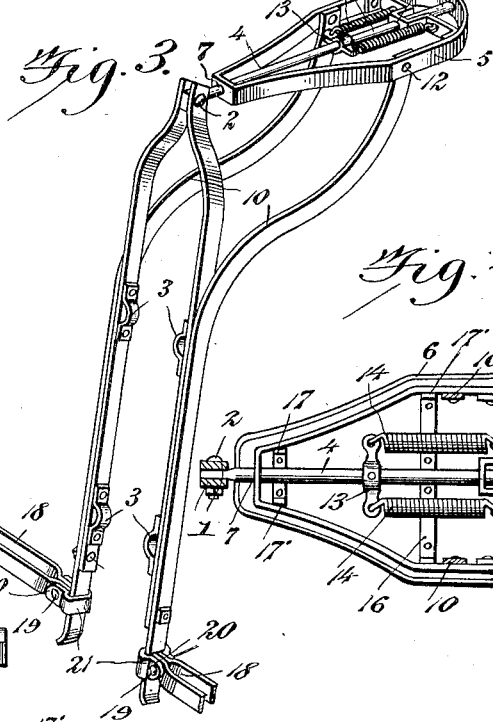
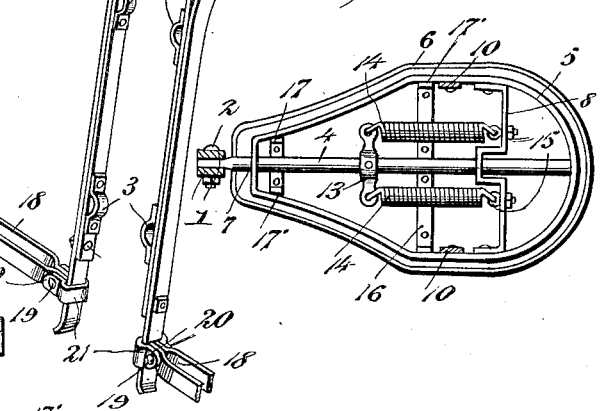
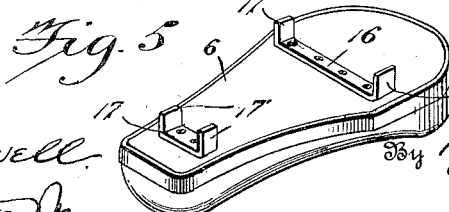
Witnesses
W. McDowell
F. M. Price Jr.
Inventor
G. A. Hartman
By Victor J. Evans
Attorney

UNITED STATES PATENT OFFICE.

GEORGE A. HARTMAN, OF DENVER, COLORADO.

MOTOR-CYCLE SEAT.

1,082,423.      Specification of Letters Patent.      Patented Dec. 23, 1913.

Application filed March 21, 1913. Serial No. 756,028.

*To all whom it may concern:*

Be it known that I, GEORGE A. HARTMAN, a citizen of the United States, residing at Denver, in the county of Denver and State of Colorado, have invented new and useful Improvements in Motor-Cycle Seats, of which the following is a specification.

This invention relates to auxiliary seats for motorcycles, the object in view being to provide a device of the class described which may be readily attached to any motorcycle frame, and which embodies a seat, the frame of which has a jointed and spring mounting relatively to the machine frame, whereby a passenger is afforded a comfortable spring seat in rear of the driver of the machine.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of the auxiliary seat shown applied to the frame of a motorcycle. Fig. 2 is a vertical cross section taken in front of the auxiliary seat frame. Fig. 3 is a perspective view of the auxiliary seat and its supporting frame complete, omitting the saddle or seat proper. Fig. 4 is a plan view of the same. Fig. 5 is a bottom perspective view of the seat proper.

The auxiliary seat contemplated in this invention comprises a seat supporting upright embodying the oppositely arranged side bars 1, the upper ends of which are brought together, preferably in the form of an arch, and connected by means of a bolt 2 extending horizontally through the upper ends of the side bars 1, as clearly illustrated in the drawings. At suitable points, the side bars 1 have secured to the inner faces thereof a plurality of clips 3 adapted to embrace the frame of the motorcycle, in the manner clearly illustrated in Fig. 2, for the purpose of fastening the seat supporting upright fixedly to the motorcycle frame. Extending rearwardly from the top of the upright is an arm 4, the forward end of which is pivotally connected to the top of the supporting upright, as shown, preferably by means of the bolt 3 hereinabove described as connecting the extremities of the side bars of said upright.

Mounted slidingly on the arm 4 is a seat frame 5, the shape of which in plan conforms somewhat to the shape of the seat proper or saddle 6, said seat frame being provided in the front end thereof with a guide opening 7, through which the arm 4 is adapted to slide, and the rear portion of the frame comprises a cross bar 8 also provided with an opening 9, through which the arm 4 is adapted to slide. In this way, the seat frame is supported at two points slidingly on the arm 4.

Interposed between the seat supporting upright and the seat frame are substantially parallel links 10, the same being pivotally connected, at 11, to the lower extremities of the side bars of the upright, and the upper ends thereof being pivotally connected, at 12, to the side portions of the seat frame 5. This admits of an up and down swinging movement of the seat frame, the rear portion of which is supported by the links 10, and the forward portion of which is supported on the arm 4 adjacent to the forward pivoted end thereof.

In order to yieldingly resist the up and down swinging movement of the seat frame, the arm 4 has fast thereon a collar 13 extending on opposite sides of said arm and having connected thereto the forward extremities of a pair of contractile springs 14, the rear extremities of which are connected to eye bolts 15 fastened to the cross bar 8 of the seat frame. The springs adapt the seat frame to slide rearwardly on the arm 4, while the latter swings on its pivotal connection with the supporting upright 1. This affords an easy spring seat support for the passenger, and enables him to ride comfortably. The seat proper or saddle 6 may be fastened in any convenient manner to the seat frame 5, the seat being shown as provided with a plurality of cross bars 16 and 17 of metal, secured to the bottom of the seat and provided at their opposite extremities with downturned projections or ears 17' which fit within the seat frame and may either be left loose or bolted, screwed, or otherwise fastened to the seat frame.

18 designates a pair of foot rests, each of which has a jointed and folding connection with the lower extremity of one of the links 10, hereinabove described, the link, for that purpose, being extended below its pivotal connection with the supporting upright. Each foot rest is shown as composed of a strip of metal bent into the form of an elongated loop, and having the inner extremities thereof brought together and pivotally secured by a bolt 19 between the outwardly projecting ears 20 of a clip 21, consisting of a metal strap bent to extend around and embrace the lower end of the link 10. When not in use, the foot rests may be folded up against the sides of the links 10, where they will be out of the way.

What is claimed is:

1. An auxiliary seat for motorcycles comprising a main seat supporting upright, means for fastening said upright to the frame of a motorcycle, an arm pivotally attached to and extending rearwardly from said upright, a seat frame slidingly mounted on said arm, pivotal links connecting said upright and seat frame, and means for yieldingly resisting the sliding movement of the seat frame on said arm.

2. An auxiliary seat for motorcycles comprising an arched main seat supporting upright, means for fastening said upright to the frame of a motorcycle, an arm pivotally attached to and extending rearwardly from said upright, a seat frame slidingly mounted on said arm, pivotal links connecting said upright and seat frame, and means for yieldingly resisting the sliding movement of the seat frame on said arm.

3. An auxiliary seat for motorcycles comprising a main seat supporting upright, means for fastening said upright to the frame of a motorcycle, an arm pivotally attached to and extending rearwardly from said upright, a seat frame slidingly mounted on said arm, pivotal links connecting said upright and seat frame, and a spring connecting the seat frame and arm and acting to resist the sliding movement of the seat frame on said arm.

4. An auxiliary seat for motorcycles comprising a main seat supporting upright, means for fastening said upright to the frame of a motorcycle, an arm pivotally attached to and extending rearwardly from said upright, a seat frame slidingly mounted on said arm, pivotal links connecting said upright and seat frame, a collar fast on said arm, and springs attached at one end to said collar and at the opposite end to the seat frame.

5. An auxiliary seat for motorcycles comprising a main seat supporting upright, means for fastening said upright to the frame of a motorcycle, an arm pivotally attached to and extending rearwardly from said upright, a seat frame slidingly mounted on said arm, pivotal links connecting said upright and seat frame, means for yieldingly resisting the sliding movement of the seat frame on said arm, and foot rests having a jointed and folding connection with said links.

In testimony whereof I affix my signature in presence of two witnesses.

GEORGE A. HARTMAN.

Witnesses:
J. KRAIMER,
W. J. RAE.

Copies of this patent may be obtained for five cents each, by addressing the "Commissioner of Patents, Washington, D. C."